United States Patent
Rajpal et al.

(10) Patent No.: US 12,149,964 B1
(45) Date of Patent: Nov. 19, 2024

(54) SYSTEMS AND METHODS FOR HIERARCHICAL ORCHESTRATION OF EDGE COMPUTING DEVICES

(71) Applicant: Verizon Patent and Licensing Inc., Basking Ridge, NJ (US)

(72) Inventors: Prashant Kumar Rajpal, Westlake, TX (US); Sivanaga Ravi Kumar Chunduru Venkata, Irving, TX (US); Anil Kumar Pabbisetty, Irving, TX (US); Sukesh Radhakrishna, McKinney, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 18/470,915

(22) Filed: Sep. 20, 2023

(51) Int. Cl.
*H04W 24/02* (2009.01)
*H04L 43/08* (2022.01)
*H04L 47/70* (2022.01)
*H04W 24/08* (2009.01)

(52) U.S. Cl.
CPC ............ *H04W 24/02* (2013.01); *H04L 43/08* (2013.01); *H04L 47/82* (2013.01); *H04W 24/08* (2013.01)

(58) Field of Classification Search
CPC ......... H04L 43/08; H04L 43/20; H04L 47/82; H04W 24/08; H04W 24/02
See application file for complete search history.

(56) References Cited

U.S. PATENT DOCUMENTS

| | | | |
|---|---|---|---|
| 2022/0116289 A1* | 4/2022 | Ramanathan | H04L 41/5051 |
| 2023/0119552 A1* | 4/2023 | Doshi | H04L 47/783 |
| | | | 709/226 |
| 2023/0145165 A1* | 5/2023 | Lee | H04L 67/133 |
| | | | 709/203 |
| 2023/0362683 A1* | 11/2023 | Sabella | H04W 24/02 |
| 2024/0235959 A1* | 7/2024 | Browne | H04L 43/0823 |

* cited by examiner

*Primary Examiner* — Rachel J Hackenberg

(57) ABSTRACT

A system described herein may monitor a set of local Key Performance Indicators ("KPIs") associated with an edge computing device. The local KPIs may not be provided to a central orchestrator that is communicatively coupled to multiple edge computing devices. The system may monitor application KPIs associated applications implemented by the edge computing device, which may be provided to the central orchestrator. The orchestration models may include conditions associated with the set of local KPIs, and orchestration actions to perform with respect to the particular edge computing based on the conditions. The system may perform orchestration actions on the particular edge computing device based on the monitored local KPIs and application KPIs. The central orchestrator may identify that the application KPIs are below a threshold and perform a second set of orchestration actions with respect to the edge computing device, or one or more other edge computing devices.

20 Claims, 9 Drawing Sheets

SYSTEMS AND METHODS FOR HIERARCHICAL ORCHESTRATION OF EDGE COMPUTING DEVICES

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may deploy edge computing systems at various geographical locations in order to provide lower latency service to UEs that are located in or near such geographical locations.

DETAILED DESCRIPTION OF EXAMPLE EMBODIMENTS

The following detailed description refers to the accompanying drawings. The same reference numbers in different drawings may identify the same or similar elements.

Figure 1:
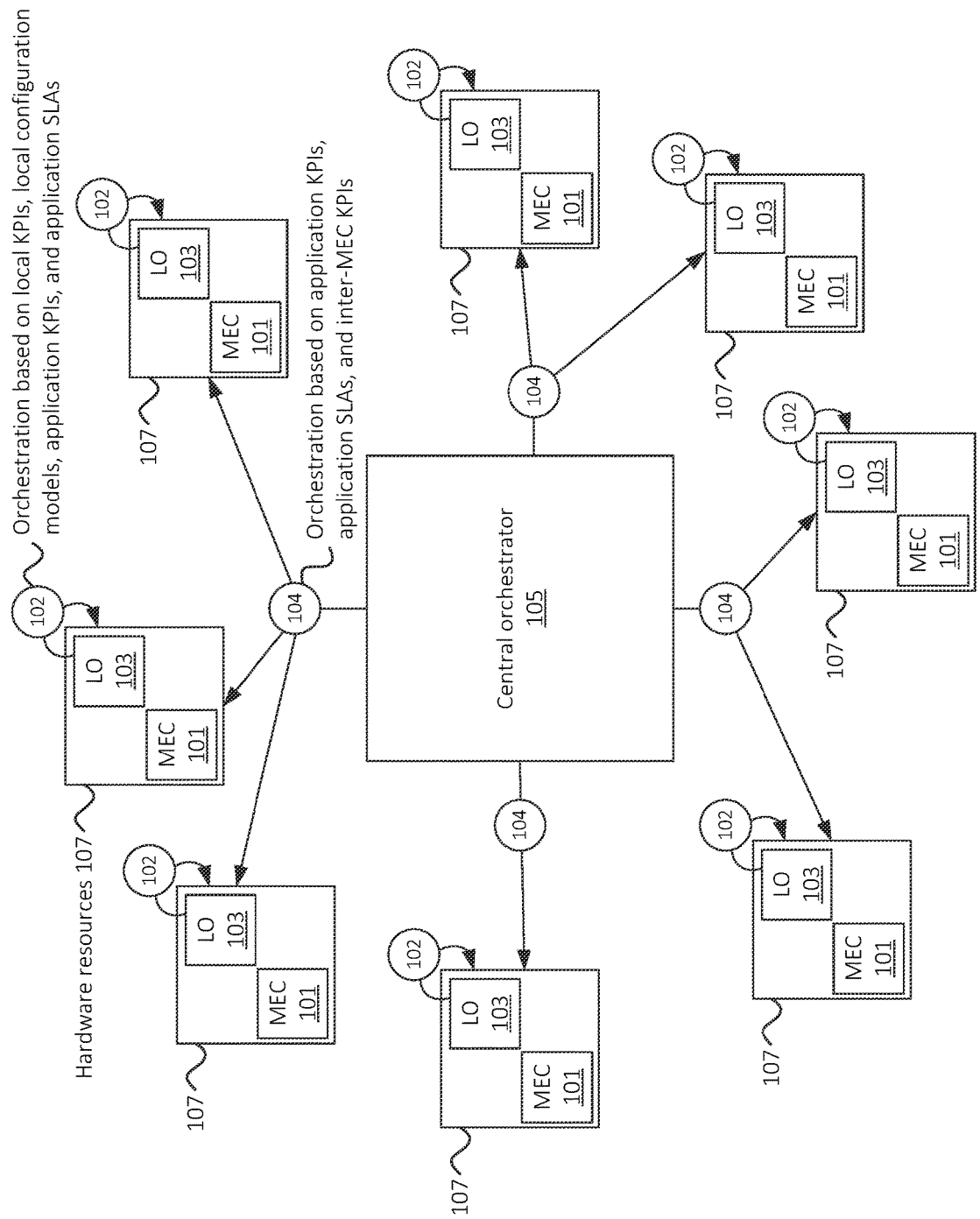
FIG. 1 illustrates an example overview of one or more embodiments described herein.

Embodiments described herein provide for the hierarchical orchestration (e.g., configuration, provisioning, etc.) of edge computing devices, such as Multi-Access/Mobile Edge Computing ("MEC") devices, referred to sometimes herein simply as "MECs." For example, as shown in FIG. 1, a set of MECs 101 may be deployed in geographically diverse locations, such as in different parts of a city or town, in different cities or towns, different states or provinces, different geographical regions, etc.

In accordance with some embodiments, each MEC 101 may be associated with a respective local orchestrator 103, which may perform (at 102) orchestration functions for each respective MEC 101. Further, each MEC 101 may be implemented at a respective set of hardware resources 107. A particular set of hardware resources 107 may include, for example, a bare metal machine, a server, a cloud computing system or a portion thereof, a virtualized environment, etc. In some embodiments, a particular set of hardware resources 107 may be co-located with, communicatively coupled to, or otherwise associated with wireless network infrastructure equipment of a RAN. For example, a particular base station of a RAN may include or may be communicatively coupled to a set of hardware resources 107 on which a particular MEC 101 is implemented. In the examples described herein, each MEC 101 is described as being associated with one set of hardware resources 107, and vice versa. In practice, the same set of hardware resources 107 may implement multiple MECs 101.

A particular local orchestrator 103, associated with a particular MEC 101, may manage resources (e.g., increase or decrease an amount of hardware resources associated with such MEC 101), manage containers or applications (e.g., instantiate, install, uninstall, etc. containers or applications) associated with MEC 101, and/or perform other types of orchestration functions associated with a given MEC 101. Additionally, a central orchestrator 105 may be communicatively coupled to multiple MECs 101, and may perform (at 104) orchestration functions for some or all MECs 101, in accordance with some embodiments.

As discussed below, local orchestrators 103 may perform (at 102) orchestration functions for each respective MEC 101 based on locally available Key Performance Indicator ("KPI") information, such as network information associated with each MEC 101 (e.g., channel quality metrics of RANs or base stations with which respective MECs 101 are associated, network load information, etc.), proprietary or sensitive application information (e.g., information generated, maintained, received, etc. by applications executing at respective MECs 101), or other information. That is, such locally available information may include information that is not available to central orchestrator 105, such as in situations where an owner or operator of MEC 101 wishes to keep such information private or otherwise secure. Additionally, or alternatively, the locally available information may include information that may otherwise consume significant processing power of central orchestrator 105 to process in order to perform orchestration functions for one or more MECs 101.

The orchestration performed (at 104) by central orchestrator 105 may include performing such orchestration functions based on inter-MEC KPI information, which may include evaluating KPIs, metrics, etc. (e.g., performance-based KPIs, load-based KPIs, etc.), model-based predictions such as expected demand at one or more MECs 101, and/or other suitable information that may not necessarily be available to respective local orchestrators 103. As discussed below, the orchestration functions performed (at 102 and 104) by local orchestrators 103 and central orchestrator 105 may be performed in a hierarchical manner. For example, in some embodiments, a given local orchestrator 103 may perform orchestration functions at a given MEC 101 in order to meet Service Level Agreements ("SLAs") or other suitable thresholds (e.g., Quality of Service ("QoS") thresholds) associated with one or more applications or services provided by such MEC 101. In scenarios where MEC 101 is unable to meet such SLAs based on orchestration (at 102) by such local orchestrator 103, central orchestrator 105 may "take over" the orchestration of MEC 101 and/or may otherwise assist in ensuring that the SLAs are met.

For example, central orchestrator 105 may assign or allocate more hardware resources 107 (e.g., of a computing platform, cloud system, bare metal machine, etc.) for MEC 101 and/or for local orchestrator 103. In this manner, local orchestrator 103 may have more resources available (e.g., processing resources, network resources, etc.) to assign to containers, applications, etc. associated with MEC 101, which may assist in meeting the SLAs of applications or services provided by MEC 101. Central orchestrator 105 may, for example, have a greater level of access or permissions to hardware resources 107 than local orchestrator 103, whereby central orchestrator 105 may allocate more of the hardware resources 107 to be available to local orchestrator 103.

As another example, central orchestrator 105 may assign or allocate different hardware resources 107 (e.g., of a different MEC 101) to assist with the applications or services for which the SLAs are not being met. For example, assume that SLAs of an application associated with a first MEC 101 are not being met. Central orchestrator 105 may instruct or configure a second MEC 101 (e.g., may provision another set of hardware resources 107 to implement the second MEC 101) to implement the same application, such that one or more UEs receiving the service from the first MEC 101 may instead receive the service from the second MEC 101. In such a scenario, some of the UEs receiving the service from the first MEC 101 may continue receiving the service from the first MEC 101. In other words, the load of providing the service, by the first MEC 101, may be split up between the first and second MECs 101. As yet another example, central orchestrator 105 may completely reassign or "fail over" one or more applications, containers, services, etc. from one MEC 101 to another (e.g., from one set of hardware resources 107 to another).

In this manner, the management of individual MECs 101 may be performed by respective local orchestrators 103, thus reducing the processing load on central orchestrator 105, and potentially conserving network resources that would otherwise be consumed in communicating relevant information to central orchestrator 105. Further, as discussed above, the orchestration by local orchestrators 103 may make use of proprietary, secure, and/or otherwise local information that is not available to central orchestrator 105, which may be due to security or privacy concerns. Additionally, the control over the manner in which respective local orchestrators 103 perform the orchestration of MECs 101 may be provided to an owner or operator of such MECs 101, rather than relying on the configuration of central orchestrator 105, which may be managed or configured by an entity other than an owner or operator of one or more MECs 101.

In some embodiments, each MEC 101 may be deployed at a respective set of hardware resources 107 (e.g., a bare metal machine, a server, a set of devices, a cloud computing system, a virtualized environment, etc.), and an associated local orchestrator 103 may be deployed at the same set of hardware resources 107. Additionally, or alternatively, a particular local orchestrator 103 may be deployed at a set of hardware resources 107 that are separate from, but are communicatively coupled to (e.g., through a private network, a local bus, and/or some other suitable communication pathway) hardware resources 107 on which an associated MEC 101 is deployed. As discussed below, each MEC 101 and/or local orchestrator 103 may be deployed at an "edge" of a wireless network, such as co-located with wireless network infrastructure equipment such as a base station, antenna, radio, access point, or the like. On the other hand, central orchestrator 105 may be deployed at a "far cloud" or in a manner that does not necessarily account for geographical location(s) of hardware resources on which central orchestrator 105 is implemented. As such, the orchestration (at 102) of respective MECs 101 by local orchestrators 103 may be performed with lower latency than may be provided by central orchestrator 105.

Figure 2:
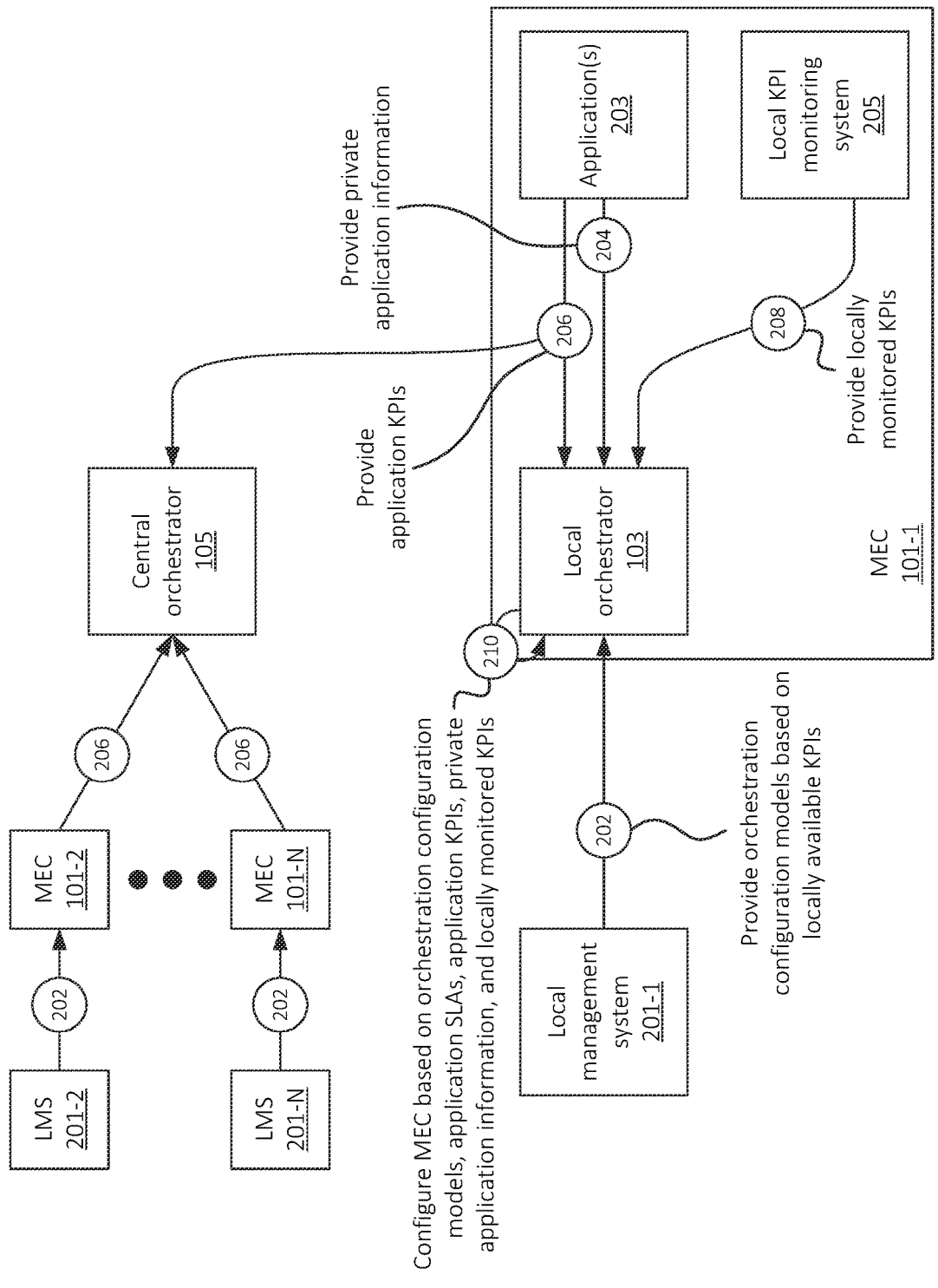
FIG. 2 illustrates an example deployment and/or configuration of a local orchestrator and a central orchestrator, in accordance with some embodiments.

FIG. 2 illustrates the example deployment and/or configuration of a particular local orchestrator 103 that is associated with a particular MEC 101 (e.g., MEC 101-1). As shown, local orchestrator 103 may be deployed as a container, application, set of applications, etc. at MEC 101-1. For example, MEC 101-1 may be provisioned, instantiated, etc. at a set of hardware resources, and local orchestrator 103 may manage, orchestrate, etc. containers and/or hardware resources associated with MEC 101-1. As discussed above, in some embodiments, local orchestrator 103 may be a separate application, device, or system from MEC 101-1, and may communicate with MEC 101-1 through a suitable interface or communicate pathway.

As shown, local orchestrator 103 may be configured (at 202) by local management system 201-1. Local management system 201-1 may be, may include, or may otherwise be associated with an owner, operator, administrator, etc. of MEC 101-1. Local management system 201-1 may communicate with local orchestrator 103 via a web portal, an application programming interface ("API"), or other suitable communication pathway. Local management system 201-1 may provide (at 202) a set of orchestration configuration models to local orchestrator 103. The orchestration configuration models may include rules, policies, criteria, conditions, etc. that indicate a manner in which local orchestrator 103 orchestrates, configures, etc. MEC 101-1. The orchestration configuration models may include factors such as locally available KPIs (e.g., as determined, collected, aggregated, etc. by local KPI monitoring system 205) and/or private application information generated, maintained, or otherwise provided by one or more applications 203 executing at MEC 101-1.

In some embodiments, the orchestration configuration models provided (at 202) by local management system 201-1 may include one or more artificial intelligence/machine learning ("AI/ML") models, lookup tables, or other suitable types of information that associate one or more factors, KPIs, etc. with orchestration and/or configuration actions. For example, one such orchestration configuration model may indicate an action such as increasing an amount of resources for a particular application 203 under a particular set of conditions (e.g., based on information received from applications 203 and/or local KPI monitoring system 205, as discussed below). For example, a pool or allocation of a particular set of hardware resources 107 may have been allocated for MEC 101-1, and local orchestrator 103 may have access to allocate such portion to applications 203 or other components of MEC 101-1. As another example, the orchestration configuration model(s) may indicate an action such as instantiating a new instance of one or more applications 203, on MEC 101-1, when another set of conditions is met.

Local management system 201-1 may have, in some embodiments, communicated with MEC 101-1 (e.g., local orchestrator 103) to install or instantiate one or more applications 203 at 101-1. In this manner, local management system 201-1 may be "aware" of the types of information that may be generated, maintained, provided by, or otherwise available from applications 203 (e.g., referred to as "private application information"). For example, in situations where MEC 101-1 (e.g., application 203) provides autonomous or semi-autonomous vehicle control services, the private application information available from application 203 may include feedback or sensor information received from one or more autonomous or semi-autonomous vehicles, vehicle location information, control instructions provided to such vehicles, etc. As noted above, such information may be sensitive, proprietary, etc., inasmuch as an owner or operator associated with local management system 201-1 may desire to prevent such information from traversing one or more networks or links between MEC 101-1 and other external devices or systems.

As such, local orchestrator 103 and application 203 may be configured (e.g., via an API or other suitable communication pathway) to communicate with each other, which may include local orchestrator 103 receiving (at 204) private application information from application 203. In some embodiments, such communication pathway may include providing communication information, associated with local orchestrator 103, to applications 203 (e.g., during a configuration or registration procedure). Such communication information may include an Internet Protocol ("IP") address of local orchestrator 103, an application identifier of local orchestrator 103, a namespace of local orchestrator 103, or other suitable communication information. Additionally, or alternatively, local management system 201-1 may provide (e.g., during a configuration or registration procedure) communication information, associated with one or more applications 203, to local orchestrator 103, based on which local orchestrator 103 may obtain or otherwise receive (at 204) private application information from applications 203. Applications 203 may provide (at 204) the private application information on a periodic basis, an event-driven basis, or some other suitable ongoing basis (e.g., as configured by local management system 201-1). In this manner, local orchestrator 103 may remain up-to-date regarding private application information associated with applications 203, including private application information that is associated with one or more orchestration configuration models (e.g., conditions, criteria, etc. indicated in such models as factors based on which orchestration actions may be determined).

In some embodiments, local orchestrator 103 may request or otherwise obtain (at 204) private application information indicated in one or more orchestration configuration models. For example, a particular orchestration configuration model may indicate a particular application 203 (e.g., may include an application name or other suitable identifier) with which private application information, used by the more orchestration configuration model, is associated. In some embodiments, a particular orchestration configuration model may indicate a type of private application information used by the particular orchestration configuration model. Local orchestrator 103 may identify a particular application 203 (out of a set of applications 203 installed at MEC 101-1) with which such private application information is associated, and may request such information from the identified particular application 203. Additionally, or alternatively, local orchestrator 103 may request the particular type of private application information from one or more applications 203 installed at MEC 101-1.

Applications 203 may also provide (at 206) application KPIs to local orchestrator 103 and to central orchestrator 105. In some embodiments, applications 203 may provide the application KPIs to local orchestrator 103, which may forward such application KPIs to central orchestrator 105. Application KPIs may include types of information to be monitored and/or reported to central orchestrator 105, based on which central orchestrator 105 may determine whether SLAs associated with such applications 203 are being met (e.g., latency-related SLAs, throughput-related SLAs, etc.). For example, applications 203 and/or local orchestrator 103 may be configured to provide the application KPIs to central orchestrator 105 on a periodic basis, an intermittent basis, and/or some other ongoing basis. The application KPIs may include, for example, latency information regarding services provided to one or more UEs via applications 203, throughput information regarding such services, user satisfaction scores associated with such services, and/or other suitable KPIs, metrics, scores, etc. Thus, while private application data and application KPIs may both be received (at 204 and 206, respectively) by local orchestrator 103, central orchestrator 105 may receive the application KPIs provided (at 206) by applications 203 without receiving the private application information.

In some embodiments, central orchestrator 105 may receive MEC KPIs from a provisioning or orchestration platform of a set of hardware resources that implement MEC 101-1, and/or from some other source. The MEC KPIs may include information associated with hardware resources on which MEC 101-1 is implemented, such as an amount of available or used resources, an operational status (e.g., "operating normally," "overheating," etc.) of the hardware resources, a geographical location of the hardware resources, and/or other suitable information. In some embodiments, some or all of the MEC KPI information may not be available to local orchestrator 103. For example, the MEC KPI information may include information that may be utilized by central orchestrator 105 to perform actions that are beyond the access or permissions granted to local orchestrator 103, such as actions related to reconfiguring or reprovisioning the hardware resources (e.g., to add or remove resources to or from MEC 101-1, add additional instances of MEC 101-1 or some other MEC 101, etc.

As further shown, local orchestrator 103 may receive (at 208) locally monitored KPIs from local KPI monitoring system 205. Local KPI monitoring system 205 may implement an API or other suitable communication pathway via which one or more devices or systems may provide such locally monitored KPIs to local KPI monitoring system 205. Such devices or systems may include, for example, an orchestrator or management platform associated with hardware resources 107, one or more containers implemented by hardware resources 107, and/or one or more devices or systems that are external to hardware resources 107.

As discussed above, the locally monitored KPIs may be collected, monitored, aggregated, etc. by local KPI monitoring system 205 without central orchestrator 105 receiving such information. The locally monitored KPIs may include sensor information, network KPIs, etc. associated with hardware resources 107 on which MEC 101-1 is implemented, and/or other information generated by or otherwise received from a device or system external to MEC 101-1 and/or to hardware resources 107 on which MEC 101-1 is implemented. For example, in some embodiments, a network controller that manages, configures, monitors, etc. wireless network infrastructure equipment that is communicatively coupled to MEC 101-1 (and/or that is communicatively coupled to hardware resources 107 on which MEC 101-1 is implemented) may provide information such as channel or signal quality metrics (e.g., Channel Quality Indicator ("CQI") values, Received Signal Strength Indicator ("RSSI") values, Reference Signal Received Power ("RSRP") values, Reference Signal Received Quality ("RSRQ") values, etc.), radio frequency ("RF") resource information (e.g., RF resources such as Physical Resource Blocks ("PRBs") that are used or available), radio access technology ("RAT") information (e.g., a RAT implemented by the wireless network, such as Long-Term Evolution ("LTE"), Fifth Generation ("5G"), etc.), and/or other suitable information associated with the wireless network. As discussed above, such information may be private and/or otherwise not available to central orchestrator 105.

Local KPI monitoring system 205 may provide (at 208) the locally monitored KPIs to local orchestrator 103 on a periodic basis, an intermittent basis, and/or some other ongoing basis. As similarly discussed above, local orchestrator 103 may request or "pull" information, from local KPI monitoring system 205, indicated as being associated with one or more orchestration configuration models. In this manner, local orchestrator 103 may be kept up-to-date regarding locally monitored KPIs, whereas central orchestrator 105 may not necessarily receive such locally monitored KPIs. As discussed above, forgoing from providing the locally monitored KPIs to central orchestrator 105 may protect the privacy of an owner or operator of MEC 101 and/or of the information sources from which the locally monitored KPIs are received.

Local orchestrator 103 may accordingly configure (at 210), or reconfigure, MEC 101-1 based on the orchestration configuration models. For example, as discussed above, the orchestration configuration models may indicate actions to perform based on particular thresholds, values, etc. of application SLAs (e.g., maximum latency thresholds associated with a given application 203, minimum throughput thresholds associated with a given application 203, etc.), private application information (received at 204), application KPIs (received at 206), locally monitored KPIs (received at 208), and/or other suitable information. As discussed above, the actions may include modifying of MEC 101-1, such as installing or uninstalling particular applications 203, allocating or deallocating resources of MEC 101-1 to or from particular applications 203, etc.

As further shown in FIG. 2, one or more other MECs (e.g., MEC 101-2, MEC 101-N, etc.) may each be associated with a respective local management system 201 (e.g., 201-2, 201-N, etc.). As such, one or more other MECs 101 may perform operations similar to those described above with respect to MEC 101-1. Similarly, central orchestrator 105 may receive (at 206) application KPIs or other suitable information associated with multiple MECs 101, without receiving locally monitored KPIs determined by each MEC 101 (e.g., by a respective local KPI monitoring system 205 associated with each MEC 101).

Figure 3:
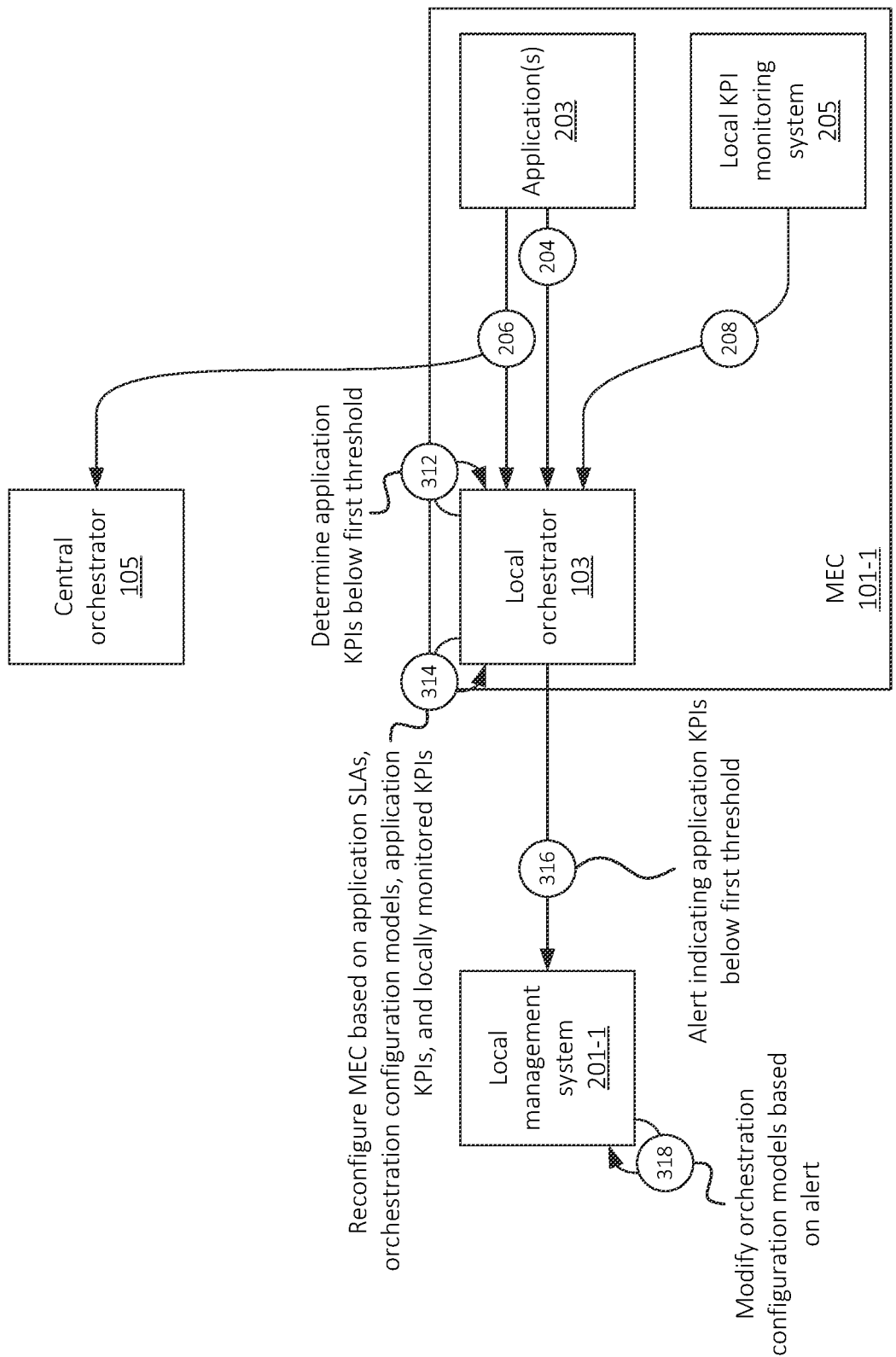
FIGS. 3-5 illustrate example scenarios in which a local orchestrator and/or central orchestrator may perform orchestration functions with respect to an edge computing device, in accordance with some embodiments.
Figure 4:
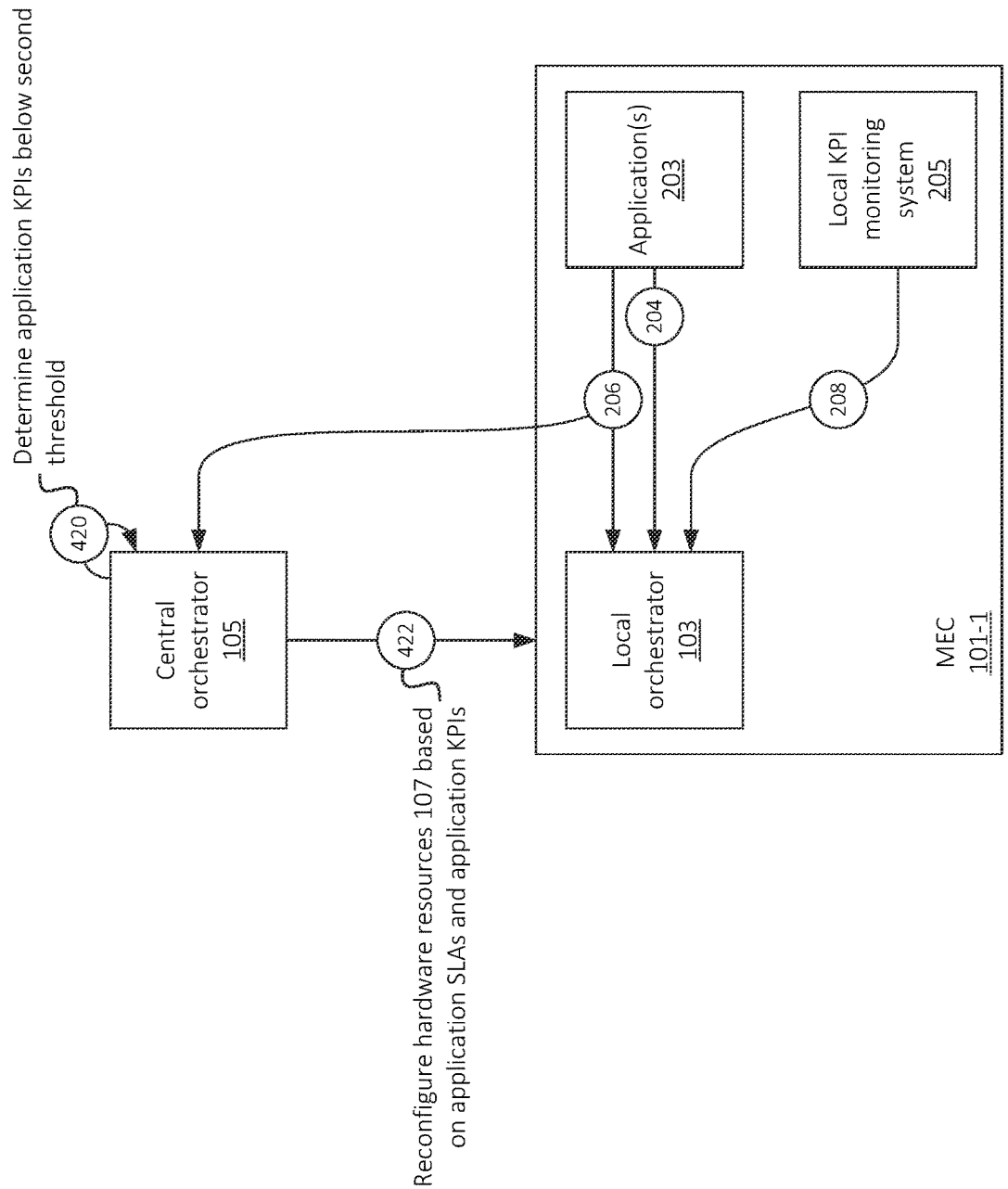
Figure 5:
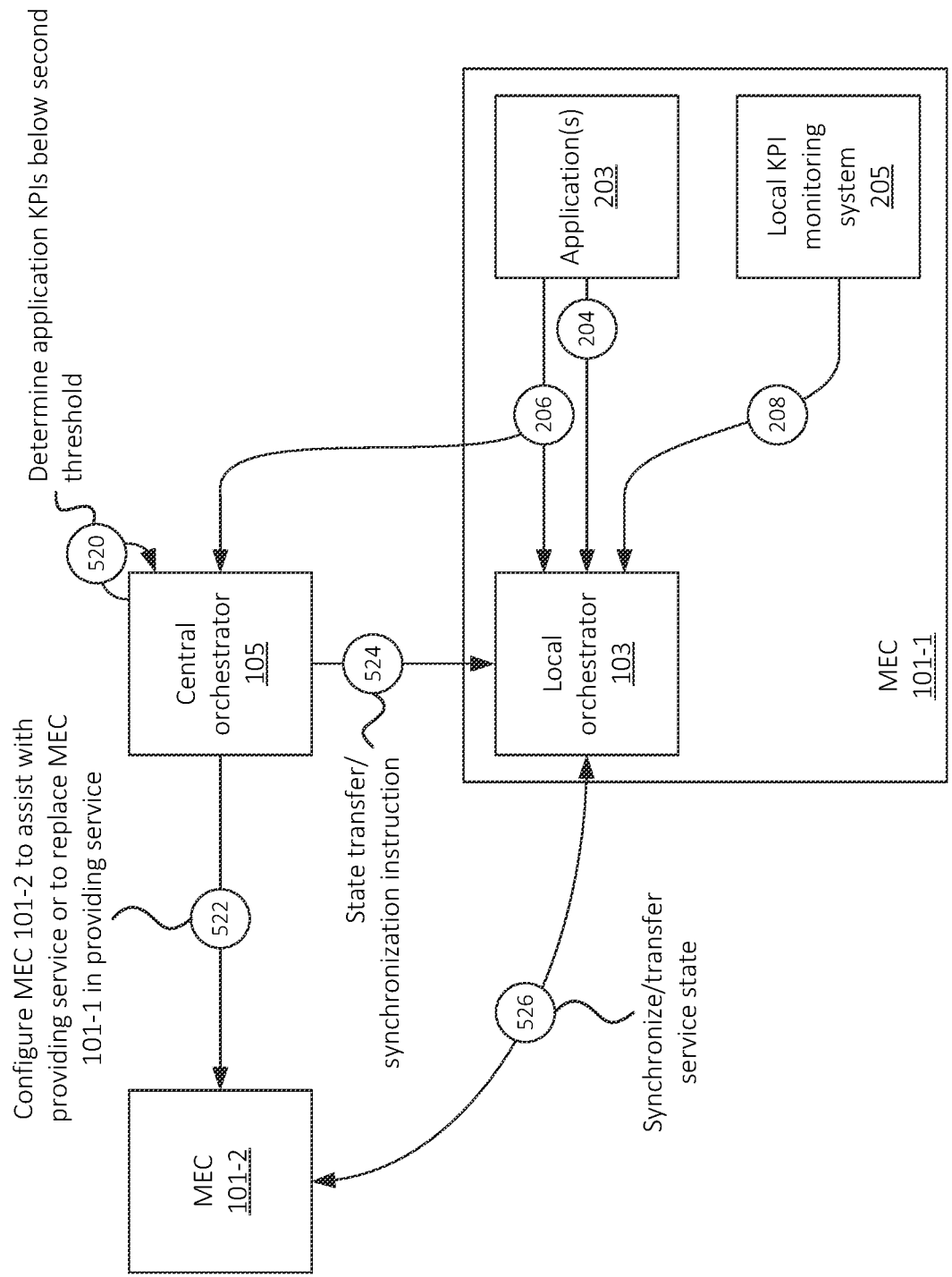

FIGS. 3-5 illustrate example actions that may be performed in accordance with some embodiments, such as actions taken by local orchestrator 103 and/or central orchestrator 105 to ensure that application SLAs (e.g., associated with one or more applications 203 installed at a given MEC 101) are met. As shown in FIG. 3, local orchestrator 103 may determine (at 312) that application KPIs are below a first threshold. In accordance with embodiments described below, the "first" threshold discussed with respect to FIG. 3 may be, or may be based on, an SLA associated with a given application 203 installed at MEC 101-1. For example, assume that a particular application 203 is associated with a maximum latency of 100 ms (milliseconds). The first threshold may be a threshold indicating that the SLA is being approached, or is in danger of not being met. As such, the first threshold may be a lower latency than the application SLA, which may give time to perform remedial measures in order to prevent the SLA from being violated. In this example, the first threshold may be 70 ms.

The terminology "below a threshold" as used with respect to these examples generally refers to "below a threshold measure of performance" or other similar concepts. For example, a relatively high latency, which is higher than a threshold latency, would be referred to as being "below a threshold" measure of latency. Similarly, a relatively low throughput, which is lower than a threshold throughput, would also be referred to as being "below a threshold" measure of throughput.

In some embodiments, although central orchestrator 105 may be kept up-to-date regarding the application KPIs (e.g., central orchestrator 105 may be "aware" that the application KPIs include an indicated latency of 70 ms), central orchestrator 105 may not be "aware" of the first threshold. In this sense, central orchestrator 105 may at this time not necessarily detect or determine that central orchestrator 105 should "step in" to ensure that the application SLAs are met, as the latency of 70 ms may not violate the 100 ms latency threshold for the particular application 203.

In this scenario, local orchestrator 103 may utilize the orchestration configuration models to reconfigure (at 314) MEC 101-1 based on identifying that the application KPIs are below the first threshold. For example, local orchestrator 103 may determine that more processing and/or network resources of MEC 101-1 should be allocated for the particular application 203, that another instance of application 203 should be installed or instantiated on MEC 101-1, or the like. Local orchestrator 103 may, after the reconfiguration, continue to monitor application KPIs or other suitable information in order to determine whether any further reconfiguration should be performed.

In some embodiments, local orchestrator 103 may output (at 316), to local management system 201-1, an alert indicating that the application KPIs are below the first threshold. In some embodiments, the alert may include information such as a log or history of locally monitored KPIs, application KPIs, private application information, or the like. Local management system 201-1 may utilize such information to refine or otherwise modify (at 318) the orchestration configuration models, in order to improve the effectiveness of such models. As discussed above, the models may be refined or improved using AI/ML techniques or other suitable techniques. In instances where the orchestration models are refined or otherwise modified, local management system 201-1 may provide (e.g., as similarly discussed at 202) the updated orchestration models to local orchestrator 103, which may potentially reconfigure MEC 101-1 based on such modified orchestration models.

As shown in FIG. 4, central orchestrator 105 may determine (at 420) that application KPIs have fallen below a second threshold, which is lower than the first threshold. For example, in some scenarios, the application KPIs may fall even lower than the first threshold in situations where configuration or reconfiguration actions performed by local orchestrator 103 are not enough to prevent or remediate the issues that caused the application KPIs to fall below the first threshold. For example, underlying hardware resources 107 of MEC 101-1 may have an issue that is unresolvable by local orchestrator 103 (e.g., power outage, hardware failure, etc.), local orchestrator 103 (e.g., MEC 101-1) may not have had enough resources available to remedy the issue, and/or local orchestrator 103 may have otherwise been unable to prevent the application KPIs from falling below the second threshold.

In some embodiments, the second threshold may be, or may be based on, application SLAs. Referring back to the previous example of the application SLAs for a particular application 203 including a maximum latency of 100 ms, the first threshold may be 70 ms and the second threshold may be 100 ms. As another example, the second threshold may be different from the application SLA, such as 90 ms, 95 ms, etc. (e.g., to potentially provide opportunity to remediate performance issues before the application SLA is violated). That is, the first threshold may be a threshold based on which it may still be possible for local orchestrator 103 to perform remediation and/or reconfiguration measures, whereas the second threshold may be a threshold based on which central orchestrator 105 is configured to "step in" or "take over" for local orchestrator 103, such as by performing actions that local orchestrator 103 may not have the access or authority to take.

For example, central orchestrator 105 may reconfigure (at 422) hardware resources 107, on which MEC 101-1 is implemented, based on determining that the application KPIs are below the second threshold. For example, central orchestrator 105 may instruct an orchestrator, management platform, etc. of hardware resources 107 to allocate additional resources to MEC 101-1. In such scenarios, local orchestrator 103 may be provided with sufficient resources to further improve the performance of MEC 101-1, which may potentially bring the application KPIs back up above the first threshold.

In some embodiments, the reconfiguration (at 422) of hardware resources 107 may be performed, by central orchestrator 105, without coordinating or communicating with local orchestrator 103. For example, local orchestrator 103 may be "unaware" that central orchestrator 105 has communicated with hardware resources 107. Instead, local orchestrator 103 may continue operating according to the orchestration configuration models, and may make use of additional resources made available by the reconfiguration by central orchestrator 105.

On the other hand, in some embodiments, local orchestrator 103 may request that central orchestrator 105 provide assistance when application KPIs fall below the second threshold. For example, local orchestrator 103 may, in some embodiments, communicate with central orchestrator 105 via an API or other suitable communication pathway, in order to request that central orchestrator 105 perform further remedial action. For example, local orchestrator 103 may determine that an amount of resources allocated to applications 203 is at or is approaching a maximum amount of available resources of MEC 101-1, and/or may otherwise determine that local orchestrator 103 is unable to (or is not likely to) remediate the performance of applications 203.

In some embodiments, as shown in FIG. 5, central orchestrator 105 may configure another MEC 101 when determining that KPIs of a service or application provided by a particular MEC 101 have fallen below the second threshold. For example, as shown, assume that central orchestrator 105 determines (at 520) that application KPIs associated with one or more applications 203 implemented by MEC 101-1 have fallen below a particular threshold (e.g., a second threshold, which may be different from a first threshold based on which local orchestrator 103 may take remedial actions), as similarly discussed above. Additionally, or alternatively, central orchestrator 105 may receive a request from local orchestrator 103 to assist with remediating the performance (e.g., KPIs) of applications 203.

In this scenario, central orchestrator 105 may determine that the service should be provided by another MEC 101-2 (e.g., that one or more applications 203 implemented by MEC 101-1 should be implemented by MEC 101-2). For example, central orchestrator 105 may determine that resources available at hardware resources 107 of MEC 101-1 are insufficient to accommodate demand for the service, that UEs receiving the service from MEC 101-1 are within a threshold proximity of MEC 101-2, that MEC 101-2 is associated with measure of performance that indicate that MEC 101-2 would be able to meet the application SLAs, and/or other suitable factors. In some scenarios, the determination by central orchestrator 105 may include determining that MEC 101-2 (and/or one or more other MECs 101) should provide the service in lieu of MEC 101-1. On the other hand, in some scenarios, central orchestrator 105 may determine that MEC 101-2 (and/or one or more other MECs 101) should provide the service in addition to MEC 101-1 (e.g., that MEC 101-1 should continue providing the service and that additional MECs 101 should also provide the service).

In this example, assume that central orchestrator 105 has determined that the service (e.g., as provided via one or more applications 203 implemented by MEC 101-1) should be provided by one or more MECs 101 in addition to or in lieu of MEC 101-1. Central orchestrator 105 may accordingly configure (at 522) MEC 101-2 to assist with providing the service or to replace MEC 101-1 in providing the service. Such configuration may include identifying a set of hardware resources 107 on which to provision or instantiate MEC 101-2 (e.g., in situations where MEC 101-2 is not already instantiated) and/or identifying MEC 101-2 from a pool of MECs 101 that have already been instantiated. In some embodiments, such configuration may include installing some or all of the applications 203, that are implemented by MEC 101-1 and/or that provide the service(s) for which the KPIs are below the second threshold, at MEC 101-2.

Central orchestrator 105 may further initiate (at 524) a state transfer and/or synchronization operation with respect to the one or more applications 203 for which the KPIs are below the second threshold. For example, central orchestrator 105 may output an instruction to local orchestrator 103 to provide (e.g., in an ongoing basis) state information, associated with the services provided by the one or more applications 203, to MEC 101-2. Additionally, or alternatively, central orchestrator 105 may instruct MEC 101-2 to obtain such state information from MEC 101-1. In some embodiments, local orchestrator 103 may request or otherwise obtain the state information from applications 203 (e.g., via an API or other suitable communication pathway) in order to provide the state information to MEC 101-2. In some embodiments, the state information transfer or synchronization operation (at 526) may be performed in some other suitable manner. As such, MEC 101-2 may be up-to-date regarding the state information, such that UEs may continue receiving the services associated with the one or more applications 203 from MEC 101-1 in a seamless manner (e.g., with minimal or zero disruption of the services).

In scenarios where MEC 101-2 is selected to provide the services in addition to MEC 101-1, the load on MEC 101-1 may be reduced, as some UEs that were receiving the service from MEC 101-1 may instead begin to receive the service from MEC 101-2. In this manner, MEC 101-1 may be able to devote relatively more resources toward providing the services to the UEs that continue to receive the services from MEC 101-1, thus potentially increasing the KPIs (e.g., reducing latency, increasing throughput, etc.) associated with the services for such UEs.

Local orchestrator 103 and central orchestrator 105 may continue to monitor application KPIs associated with applications 203 (e.g., after some or all of the remedial measures discussed above with respect to FIGS. 3-5), such that local orchestrator 103 and/or central orchestrator 105 may ensure that application SLAs are met. The decentralized nature of the orchestration performed by local orchestrators 103 of MECs 101 may provide for more individual control of such MECs 101 (e.g., by owners and/or operators of such MECs 101), as well as privacy and security of data used to perform the local orchestration by local orchestrators 103. Further, the load on central orchestrator 105 (and/or of network links between central orchestrator 105 and respective MECs 101) may be reduced inasmuch as central orchestrator 105 may not need to send or receive as much information to or from MECs 101 in order to perform orchestration functions, and central orchestrator 105 may not need to perform as much processing in order to enforce application SLAs.

Figure 6:
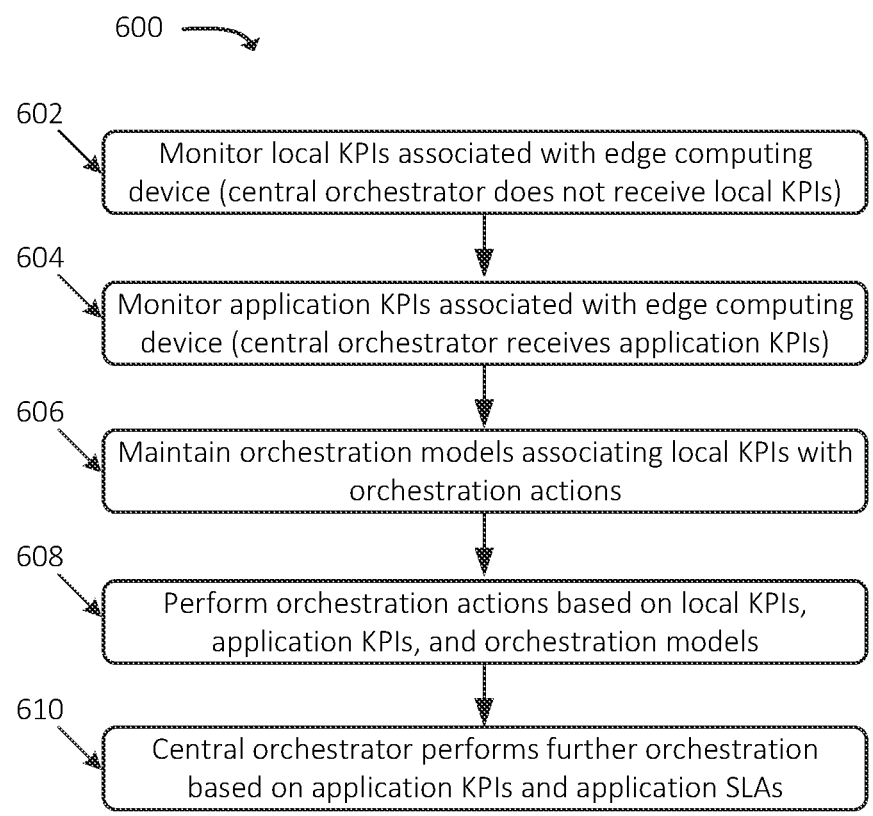
FIG. 6 illustrates an example process for orchestrating one or more edge computing devices in a hierarchical manner, in accordance with some embodiments.

FIG. 6 illustrates an example process 600 for orchestrating one or more MECs 101 in a hierarchical manner (e.g., to meet one or more application SLAs for one or more applications 203 implemented by a particular edge computing device, such as a particular MEC 101). In some embodiments, some or all of process 600 may be performed by local orchestrator 103 associated with the particular edge computing device. In some embodiments, one or more other devices may perform some or all of process 600 in concert with local orchestrator 103, such as central orchestrator 105.

As shown, process 600 may include monitoring (at 602) local KPIs associated with a particular edge computing device, such as a particular MEC 101. As discussed above, the local KPIs may be received from and/or generated by the particular edge computing device. For example, as discussed above, the particular edge computing device may include or implement local KPI monitoring system 205, which may monitor or receive information regarding hardware resources 107 on which the particular edge computing device is implemented, information regarding a network to which the particular edge computing device is communicatively coupled, and/or other suitable types of information. Additionally, or alternatively, local orchestrator 103 may receive private application information from one or more applications 203 implemented by the particular edge computing device. As discussed above, the locally monitored KPIs and/or private application information may not be provided to central orchestrator 105, which may be communicatively coupled to multiple edge computing devices (e.g., multiple MECs 101).

Process 600 may further include monitoring (at 604) application KPIs associated with the edge computing device. Additionally, as discussed above, central orchestrator 105 may receive the application KPIs as well. In some embodiments, central orchestrator 105 may receive one or more application KPIs without local orchestrator 103 receiving such application KPIs. As discussed above, the application KPIs may include performance metrics, user satisfaction scores, and/or other suitable information based on which local orchestrator 103 and/or central orchestrator 105 may determine whether one or more SLAs, QoS thresholds, or other suitable thresholds are being met with respect to the providing of one or more services associated with one or more applications 203 implemented by the edge computing device.

Process 600 may additionally include maintaining (at 606) a set of orchestration models associating local KPIs and/or other suitable information with orchestration actions. As discussed above, local orchestrator 103 may use the models to identify orchestration actions such as allocating resources to containers and/or applications 203, deallocating such resources, instantiating containers, installing additional instances of applications 203, etc. In some embodiments, the orchestration models may include additional factors based on which orchestration actions may be determined, such as application KPIs, private application information, application SLAs, etc.

Process 600 may also include performing (at 608) one or more orchestration actions based on the local KPIs, application KPIs, and/or other suitable information. For example, based on monitoring the local KPIs, application KPIs, etc., local orchestrator 103 may identify particular orchestration actions as indicated in the orchestration models, and may perform such actions (e.g., configuring resources of the particular edge computing device, instantiating containers, etc.).

Process 600 may further include performing (at 610), by central orchestrator 105, further orchestration of the edge computing device based on the application KPIs, application SLAs, and/or other information. For example, as discussed above, central orchestrator 105 may determine that one or more application SLAs are not being met and/or are likely to not be met (e.g., based on predictive techniques). As another example, local orchestrator 103 of the edge computing device may output a request for central orchestrator 105 to assist with providing services associated with one or more applications 203 in accordance with SLAs for such applications 203. As yet another example, central orchestrator 105 may determine, based on other information (e.g., based on UE locations, based on expected demand at a given location for a particular service, based on scheduled events such as sporting events or concerts, etc.) that additional orchestration should be performed in order to meet SLAs associated with one or more applications 203 implemented by the edge computing device. For example, as discussed above, central orchestrator 105 may cause a different edge computing device to provide such services in addition to, or in lieu of, the particular edge computing device. Additionally, or alternatively, central orchestrator 105 may perform orchestration operations that are not available to local orchestrator 103, such as allocating additional resources 107 for the particular edge computing device.

Figure 7:
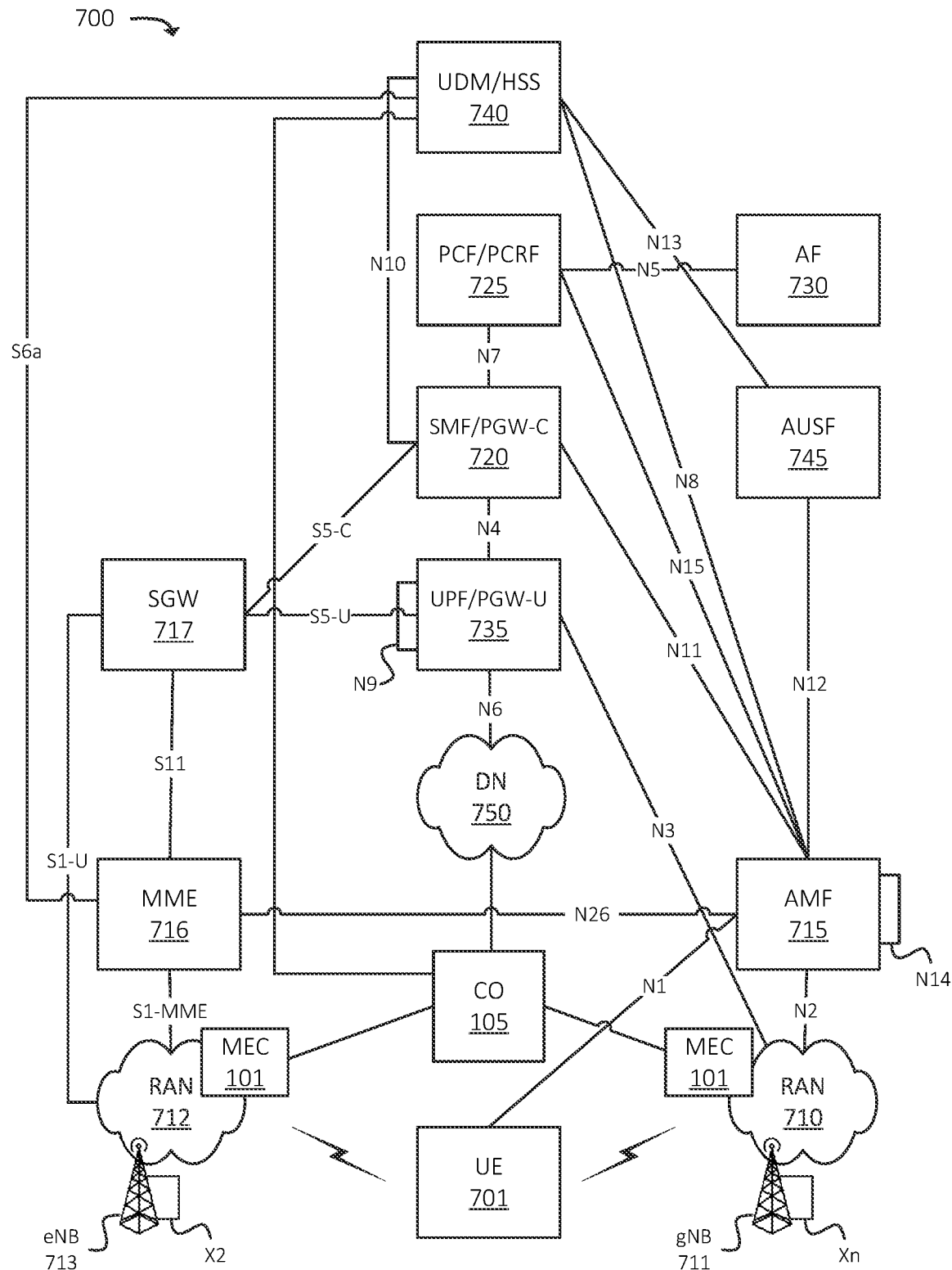
FIG. 7 illustrate example environments in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 701, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750, RAN 710, RAN 712, etc.), such as central orchestrator 105.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., user plane traffic such as voice call traffic, data traffic, messaging traffic, etc.) from UE 701 via the air interface, and may communicate the traffic to UPF/PGW-U 735 and/or one or more other devices or networks. Further, RAN 710 may receive signaling traffic, control plane traffic, etc. from UE 701 via the air interface, and may communicate such signaling traffic, control plane traffic, etc. to AMF 715 and/or one or more other devices or networks. Additionally, RAN 710 may receive traffic intended for UE 701 (e.g., from UPF/PGW-U 735, AMF 715, and/or one or more other devices or networks) and may communicate the traffic to UE 701 via the air interface. In some embodiments, RAN 710 may include one or more MECs 101, which may be communicatively coupled to gNB 711 and/or other wireless network infrastructure equipment associated with RAN 710. In some situations, traffic received via RAN 710 (e.g., by gNB 711) from UE 701 may be forwarded to MEC 101 in lieu of to a core network (e.g., in lieu of to UPF/PGW-U 735).

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 701 via the air interface, and may communicate the traffic to UPF/PGW-U 735 (e.g., via SGW 717) and/or one or more other devices or networks. Further, RAN 712 may receive signaling traffic, control plane traffic, etc. from UE 701 via the air interface, and may communicate such signaling traffic, control plane traffic, etc. to MME 716 and/or one or more other devices or networks. Additionally, RAN 712 may receive traffic intended for UE 701 (e.g., from UPF/PGW-U 735, MME 716, SGW 717, and/or one or more other devices or networks) and may communicate the traffic to UE 701 via the air interface. In some embodiments, RAN 712 may include one or more MECs 101, which may be communicatively coupled to eNB 713 and/or other wireless network infrastructure equipment associated with RAN 712. In some situations, traffic received via RAN 712 (e.g., by eNB 713) from UE 701 may be forwarded to MEC 101 in lieu of to a core network (e.g., in lieu of to UPF/PGW-U 735).

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple instances of UPF/PGW-U 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with one or more UEs 701 and/or one or more communication sessions associated with one or more UEs 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
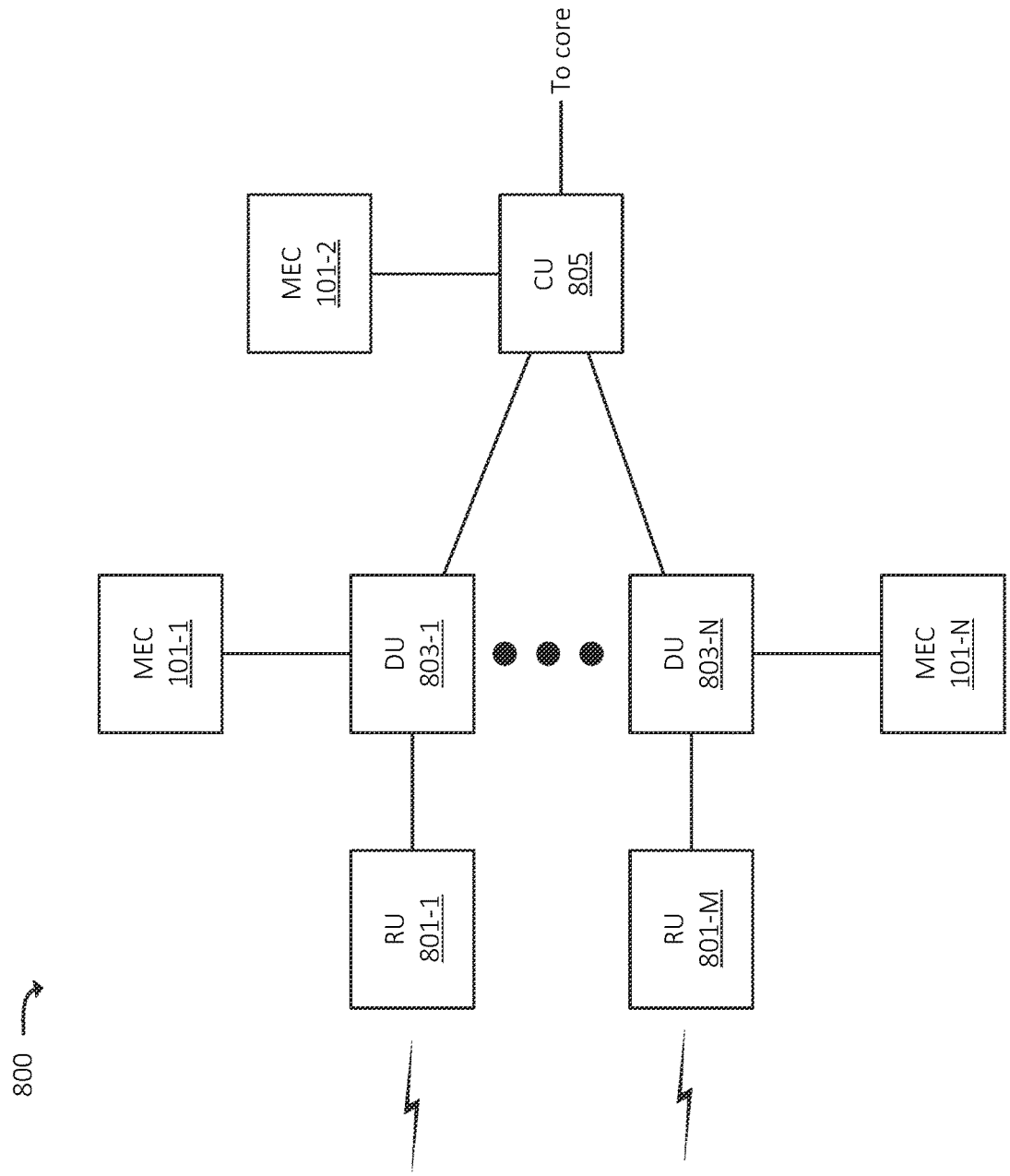
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 710 or some other RAN). In some embodiments, a particular RAN 710 may include one RAN environment 800. In some embodiments, a particular RAN 710 may include multiple RAN environments 800. In some embodiments, RAN environment 800 may correspond to a particular gNB 711 of RAN 710. In some embodiments, RAN environment 800 may correspond to multiple gNBs 711. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715, MME 716, and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

One or more elements of RAN environment 800 may, in some embodiments, be communicatively coupled to one or more MECs 101. For example, DU 803-1 may be communicatively coupled to MEC 101-1, DU 803-N may be communicatively coupled to MEC 101-N, CU 805 may be communicatively coupled to MEC 101-2, and so on. MECs 101 may include or may be implemented by hardware resources 107 (e.g., configurable or provisionable hardware resources) that may be configured to provide services and/or otherwise process traffic to and/or from UE 701, via a respective RU 801.

For example, DU 803-1 may route some traffic, from UE 701, to MEC 101-1 instead of to a core network via CU 805. MEC 101-1 may process the traffic, perform one or more computations based on the received traffic, and may provide traffic to UE 701 via RU 801-1. In some embodiments, MEC 101 may include, and/or may implement, some or all of the functionality described above with respect to a UPF, AF 730, and/or one or more other devices, systems, VNFs, CNFs, etc. In this manner, ultra-low latency services may be provided to UE 701, as traffic does not need to traverse DU 803, CU 805, links between DU 803 and CU 805, and an intervening backhaul network between RAN environment 800 and the core network.

Figure 9:
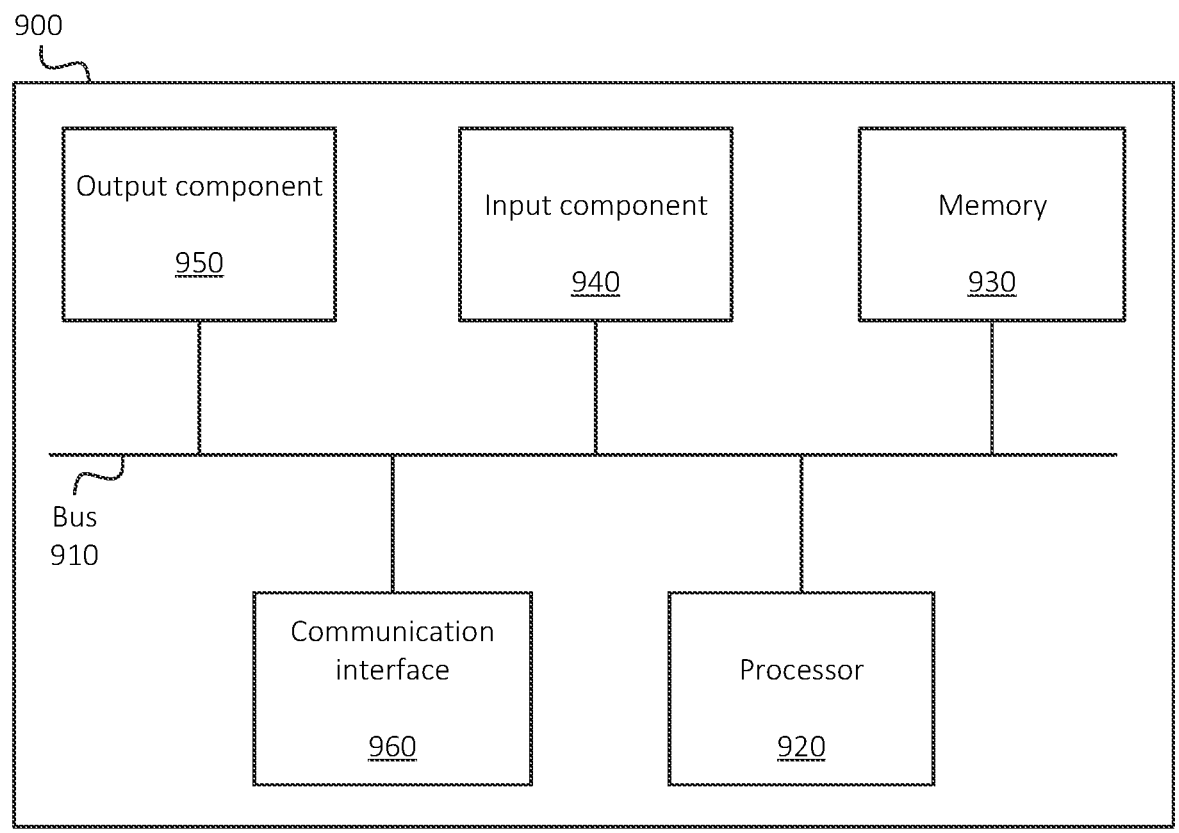
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising: one or more processors configured to:
    monitor a set of local Key Performance Indicators ("KPIs") associated with a particular edge computing device, wherein the particular edge computing device implements a particular set of applications, wherein the local KPIs are not provided to a central orchestrator that is communicatively coupled to the particular edge computing device and a plurality of other edge computing devices;
    monitor a set of application KPIs associated the particular set of applications, wherein the application KPIs are provided to the central orchestrator;
    maintain a set of orchestration models that each include: one or more conditions or criteria associated with the set of local KPIs, and orchestration actions to perform with respect to the particular edge computing device based on the conditions or criteria;
    and perform a first set of orchestration actions with respect to the particular edge computing device based on the set of local KPIs, the set of application KPIs, and the set of orchestration models, wherein the central orchestrator identifies that the application KPIs are below a threshold and performs, based on identifying that the application KPIs are below the threshold, a second set of orchestration actions with respect to one or more edge computing devices.

2. The device of claim 1, wherein the local KPIs include network information associated with a wireless network to which the particular edge computing device is communicatively coupled.

3. The device of claim 2, wherein the wireless network includes a radio access network ("RAN"), wherein the local KPIs include at least one of:
    load metrics associated with the RAN, or
    channel quality information associated with the RAN.

4. The device of claim 1, wherein performing the first set of orchestration actions includes:
    allocating a set of resources of the edge computing device for the particular set of applications, wherein allocating the set of resources includes at least one of:
        increasing an amount of resources associated with one or more containers that implement the particular set of applications, or
        instantiating one or more additional containers to implement the particular set of applications.

5. The device of claim 1, wherein the second set of orchestration actions includes provisioning additional resources, of a set of hardware resources on which the particular edge computing device is implemented, for the particular edge computing device.

6. The device of claim 5, wherein the one or more processors are further configured to:
    perform a third set of orchestration actions, after the additional resources have been provisioned, wherein the third set of orchestration actions includes allocating at least a portion of the additional resources for the particular set of applications.

7. The device of claim 1, wherein the particular edge computing device is a first edge computing device, wherein the second set of orchestration actions includes configuring at least a second edge computing device to implement the particular set of applications.

8. A non-transitory computer-readable medium, storing a plurality of processor-executable instructions to:
    monitor a set of local Key Performance Indicators ("KPIs") associated with a particular edge computing device, wherein the particular edge computing device implements a particular set of applications, wherein the local KPIs are not provided to a central orchestrator that is communicatively coupled to the particular edge computing device and a plurality of other edge computing devices;
    monitor a set of application KPIs associated the particular set of applications, wherein the application KPIs are provided to the central orchestrator;
    maintain a set of orchestration models that each include: one or more conditions or criteria associated with the set of local KPIs, and orchestration actions to perform with respect to the particular edge computing device based on the conditions or criteria;
    and perform a first set of orchestration actions with respect to the particular edge computing device based on the set of local KPIs, the set of application KPIs, and the set of orchestration models, wherein the central orchestrator identifies that the application KPIs are below a threshold and performs, based on identifying that the application KPIs are below the threshold, a second set of orchestration actions with respect to one or more edge computing devices.

9. The non-transitory computer-readable medium of claim 8, wherein the local KPIs include network information associated with a wireless network to which the particular edge computing device is communicatively coupled.

10. The non-transitory computer-readable medium of claim 9, wherein the wireless network includes a radio access network ("RAN"), wherein the local KPIs include at least one of:

load metrics associated with the RAN, or channel quality information associated with the RAN.

11. The non-transitory computer-readable medium of claim 8, wherein performing the first set of orchestration actions includes:

allocating a set of resources of the edge computing device for the particular set of applications, wherein allocating the set of resources includes at least one of:

increasing an amount of resources associated with one or more containers that implement the particular set of applications, or instantiating one or more additional containers to implement the particular set of applications.

12. The non-transitory computer-readable medium of claim 8, wherein the second set of orchestration actions includes provisioning additional resources, of a set of hardware resources on which the particular edge computing device is implemented, for the particular edge computing device.

13. The non-transitory computer-readable medium of claim 12, wherein the plurality of processor-executable instructions further include processor-executable instructions to:

perform a third set of orchestration actions, after the additional resources have been provisioned, wherein the third set of orchestration actions includes allocating at least a portion of the additional resources for the particular set of applications.

14. The non-transitory computer-readable medium of claim 8, wherein the particular edge computing device is a first edge computing device, wherein the second set of orchestration actions includes configuring at least a second edge computing device to implement the particular set of applications.

15. A method, comprising:

monitoring a set of local Key Performance Indicators ("KPIs") associated with a particular edge computing device, wherein the particular edge computing device implements a particular set of applications, wherein the local KPIs are not provided to a central orchestrator that is communicatively coupled to the particular edge computing device and a plurality of other edge computing devices;

monitoring a set of application KPIs associated the particular set of applications, wherein the application KPIs are provided to the central orchestrator;

maintaining a set of orchestration models that each include: one or more conditions or criteria associated with the set of local KPIs, and orchestration actions to perform with respect to the particular edge computing device based on the conditions or criteria;

and performing a first set of orchestration actions with respect to the particular edge computing device based on the set of local KPIs, the set of application KPIs, and the set of orchestration models, wherein the central orchestrator identifies that the application KPIs are below a threshold and performs, based on identifying that the application KPIs are below the threshold, a second set of orchestration actions with respect to one or more edge computing devices.

16. The method of claim 15, wherein the local KPIs include network information associated with a radio access network ("RAN") to which the particular edge computing device is communicatively coupled, wherein the local KPIs include at least one of:

load metrics associated with the RAN, or channel quality information associated with the RAN.

17. The method of claim 15, wherein performing the first set of orchestration actions includes:

allocating a set of resources of the edge computing device for the particular set of applications, wherein allocating the set of resources includes at least one of:

increasing an amount of resources associated with one or more containers that implement the particular set of applications, or instantiating one or more additional containers to implement the particular set of applications.

18. The method of claim 15, wherein the second set of orchestration actions includes provisioning additional resources, of a set of hardware resources on which the particular edge computing device is implemented, for the particular edge computing device.

19. The method of claim 18, further comprising:

perform a third set of orchestration actions, after the additional resources have been provisioned, wherein the third set of orchestration actions includes allocating at least a portion of the additional resources for the particular set of applications.

20. The method of claim 15, wherein the particular edge computing device is a first edge computing device, wherein the second set of orchestration actions includes configuring at least a second edge computing device to implement the particular set of applications.

\* \* \* \* \*